Feb. 19, 1952     H. W. LENSNER     2,586,353
PROTECTIVE RELAYING SYSTEM
Filed June 29, 1950
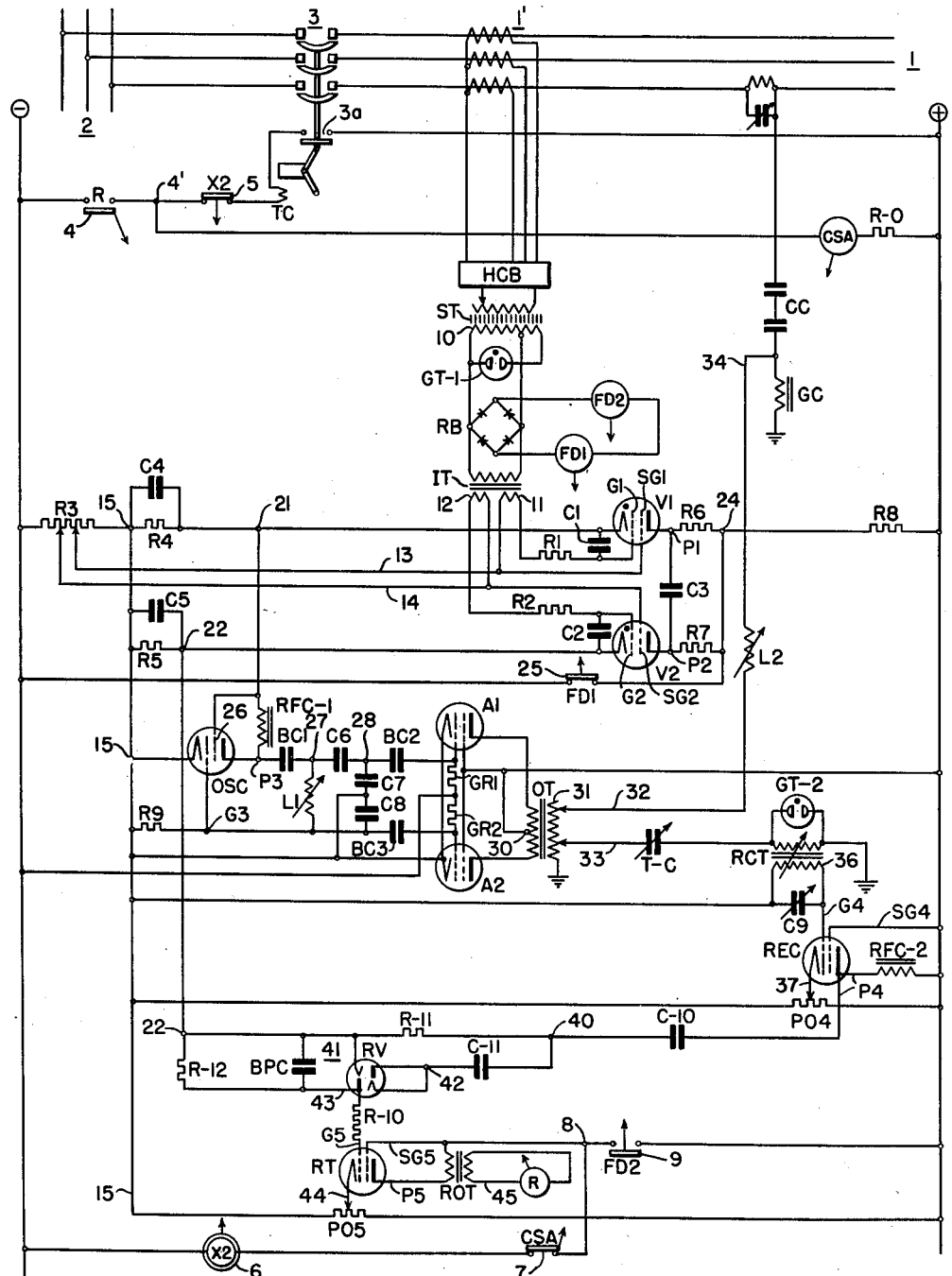
WITNESSES:
Edward Michaels
Nw. C. Groome
INVENTOR
Herbert W. Lensner.
BY O. B. Buchanan
ATTORNEY Patented Feb. 19, 1952

2,586,353

UNITED STATES PATENT OFFICE 2,586,353

PROTECTIVE RELAYING SYSTEM

Herbert W. Lensner, East Orange, N. J., assignor to Westinghouse Electric Corporation, East Pittsburgh, Pa., a corporation of Pennsylvania Application June 29, 1950, Serial No. 171,133

6 Claims. (Cl. 175—294)

1

My invention relates to high-speed or instantaneous protective relaying systems using carrier-current or other pilot-channel-means for comparing the line-conditions at the two terminals of the protected line-section for discriminating between an internal fault, within the line-section, and an external fault, or a fault which is outside of the protected section, elsewhere on the transmission-line.

While an external fault is being cleared, in another line-section of such a system, and for a few line-current cycles thereafter, there may be a brief interruption or other distrubance of the carrier-current, which may cause an incorrect trip-out of the protected line-section.

It is an object of my present invention to provide means for quickly responding to a fault-detection, which may be either an internal fault or an external fault, plus a pilot-channel means for responding if the fault is an internal fault, plus a time-delay means, associated with said fault-detector, for temporarily blocking a tripping operation if the internal-fault indication is not obtained within 3 line-current cycles, or other brief time, after the fault-detector response.

A further object of my invention is to provide means, responsive to an internal-fault indication, for quickly deenergizing the time-delay means, without waiting for the fault-detector to drop out, thus making it possible to clear an internal fault which may develop within a few cycles after the occurrence of an external fault.

With the foregoing and other objects in view, my invention consists in the systems, circuits, combinations, parts, and methods of design and use, hereinafter described and claimed, and illustrated in the accompanying drawing, wherein the single figure is a diagrammatic view of circuits and apparatus illustrating my invention in an exemplary form of embodiment.

In the drawing, I have illustrated my invention as applied to one terminal of a line-section 1 of a 3-phase transmission-line, which is connected to a 3-phase station-bus 2 by means of a circuit-breaker 3. The circuit-breaker has a trip-coil TC and an auxiliary make-contact 3a. I have shown only one terminal of the protected line-section 1, with the understanding that the other terminal is, or may be, a duplicate of the terminal equipment which is illustrated.

The trip circuit for the trip-coil TC extends from the negative bus (—) to the make-contact, or normally open contact 4, of a pilot-channel relaying-means R for obtaining a selective instantaneous internal-fault indication, in response

2 to a comparison of line-conditions at the two terminals of the protected line-section. After the pilot-channel relay-contact 4, the tripping circuit continues, through a conductor 4', to a normally closed back-contact 5 of a time-delay relay X2, and thence to the trip-coil C of the line-sectionalizing circuit-breaker 3, this tripping circuit thereafter extending on to the positive bus (+) through the auxliary breaker-contact 3a. The intermediate conductor 4' of the tripping circuit also branches off to energize the coil of an instantaneously operating auxiliary relay CSA, through a resistor R—O, and thence to the positive bus (+), thus energizing the auxiliary relay CSA whenever the pilot-channel relay R responds to an internal fault.

The circuits of the several relays which are utilized in my invention are arranged, as far as practicable, after the manner of a schematic diagram or "across-the-line" diagram. In each case, the main or operating coil of the relay is given a letter-designation or legend, and the same letter-designation or legend is applied to the contact (or contacts) of that relay. The relays and switches are invariably shown in their open or deenergized positions. Arrows are used, to symbolically indicate how the various parts of each relay are connected together.

The time-delay relay X2 is a slow-to-operate telephone-type relay, having an operating-coil X2 which is shown at the bottom of the figure. This relay is provided with any suitable short-period time-delay means, which may conveniently be a short-circuited coil or slug 6, for causing the relay to have a pickup time of 5 cycles of the line-current, and a dropout time of about 6 to 8 cycles of the line-current frequency, based on an assumption of a 60-cycle line. As shown at the bottom of the figure, the slow-relay coil X2 is energized in series with the normally closed back-contact 7 of the auxiliary relay CSA, in a circuit which extends from the negative bus (—) to a conductor 8, whence the circuit extends on to the positive bus (+) through the make-contact 9 of a high-set fault-detector FD2, which forms a part of the carrier-current control-equipment which will be subsequently described.

The operating-coil R of the internal-fault-responsive pilot-channel relay R is shown near the bottom of the figure. While any suitable type of pilot-channel protective-relaying equipment might be used, my present invention is particularly designed or adapted for a particular type of pilot-channel relaying-means, such as is described and claimed in a copending application of S. L. Goldsborough, R. C. Cheek and myself, Serial No. 758,200, filed June 30, 1947, now Patent No. 2,539,444. The illustrated system uses a pilot-channel communicating-means in the form of carrier-currents superimposed on one conductor of the protected line-section, although said channel might have been pilot-wires, directed microwave radio, or other means. The illustrated system is especially designed to effect its selective response to an internal fault, that is, a fault within the protected line-section, by a comparison of the phase-angles of the line-currents at the opposite ends of the line-section, and by making use of two fault-detectors of differing sensitivities, but the comparison of line-conditions at the opposite ends could be made in other ways.

In the illustrated protective-relaying equipment, I utilize a bank of line-current transformers 1, which respond to the 3-phase line-current in the protected line-section 1, and which supply this current to any suitable network or filter, which is marked HCB, for deriving a single-phase alternating-current voltage which is applied to the primary winding of a saturable transformer ST. Any suitable network, such as HCB, may be utilized, for deriving a single-phase relaying current or voltage which is reasonably uniformly responsive to a plurality of kinds and severities of faults on whatever line-phase a fault may occur. The secondary winding 10 of the saturable transformer ST is shunted by a voltage-limiting gas-filled tube GT-1, as described in the Harder Patent 2,183,646, granted December 19, 1939.

The secondary winding 10 is utilized to control two mechanical fault-detector relays FD1 and FD2 having diverse sensitivity-settings, and also to control two alternately triggering gas-filled tubes V1 and V2. The operating-coils of the two fault-detector relays FD1 and FD2 are shown as being energized in series with each other, from the output-terminals of a rectifier-bridge RB, which is supplied with energy from the secondary winding 10 of the saturating transformer ST.

The gas-filled tubes V1 and V2 are controlled from the aforesaid secondary winding 10 by having the respective tube-grids G1 and G2 energized, through resistors R1 and R2, from two secondary windings 11 and 12 of an input-transformer IT, the primary of which is energized from the secondary winding 10 of the saturating transformer ST. The other two terminals 13 and 14 of the secondary windings 11 and 12 of the input-transformer IT are connected either to the same intermediate tapped-point, or to two different intermediate tapped-points, of a cathode-circuit biasing-resistor R3, which is in the cathode-circuits of the two gas-tubes V1 and V2. These tap-connections 13 and 14, for the control-grids of the two gas-tubes V1 and V2, are both set for the same firing-point or voltage, which is 60% of the voltage corresponding to the first, or more sensitive, fault-detector FD1, so that whenever said first fault-detector FD1 picks up, both of the gas-tubes V1 and V2 stand ready to commence firing instantly, on their respective half-cycles of the line-frequency current, as will be subsequently clear.

As shown in the drawing, one terminal of the cathode-circuit biasing-resistor R3 is connected to the negative bus (−) of a direct-current voltage-source, while the other terminal of said resistor is connected to a conductor 15, which is utilized for several purposes. The circuit 15 is utilized to energize one terminal of a cathode-circuit loading-resistor R4, the other terminal of which is connected to the cathode-terminal 21 of the first gas-tube V1. The circuit 15 is also utilized to energize one terminal of another cathode-circuit loading-resistor R5, the other terminal of which is connected to the cathode-circuit 22 of the second gas-tube V2.

The two control-grid terminals of these tubes V1 and V2 are connected to their respective cathode-circuits 21 and 22 through capacitors C1 and C2, as is known in the art. The two plate-circuits P1 and P2 of these two tubes are connected together through a capacitor C3 which assists in the firing-transfer, as explained in the Mehring et al. Patent 2,408,868, granted October 8, 1946. The two cathode-circuit loading-resistors R4 and R5 are respectively shunted by capacitors C4 and C5, which also assist in the firing-transfer, as set forth in the Mehring et al. patent. The circuits 13 and 14, which are connected to an intermediate tap or taps of the cathode-circuit biasing resistor R3, are also connected to the screen-grids SG1 and SG2 of the respective gas-tubes V1 and V2. The two plate or anode-circuits P1 and P2 of the two gas-tubes are connected, respectively, through resistors R6 and R7, to a common conductor 24, which is in turn connected to the positive bus (+) through a resistor R8.

The two alternately firing gas-tubes V1 and V2 are supervised by the low-set fault-detector FD1, by having the positive tube-circuit 24 connected to the negative terminal (−) through the normally closed back-contact 25 of said low-set fault-detector FD1.

The cathode-circuits 21 and 22 of the respective gas-filled tubes V1 and V2 are utilized as sources of two alternating series of square-topped positive-voltage impulses, for two different purposes, as will subsequently be described. These positive-voltage impulses are the voltage-drops through the respective cathode-circuit loading-resistors R4 and R5, which have voltage-drops therein when their respective tubes V1 and V2 are firing.

In the drawing, immediately below the gas-tubes V1 and V2, I have diagrammatically indicated the essential parts of a simplified form of embodiment of a standard carrier-transmitter, comprising a carrier-current master-oscillator tube OSC, which is intermittently operated in response to the first gas-tube V1. Thus, the carrier-current master-oscillator tube OSC has its plate-circuit P3 energized from the cathode-circuit 21 of the first gas-tube V1, through a radio-frequency choke-coil RFC-1. Its screen-grid 26 is also connected to said cathode-circuit 21. The cathode-circuit of the oscillator OSC is the previously mentioned circuit or conductor 15. The oscillator has a grid-circuit G3 which is connected to the cathode-circuit 15 through a grid-resistor R9.

The plate-circuit P3 of the oscillator OSC is connected, through a blocking-capacitor BC1, to an intermediate terminal 27 of a tuned carrier-frequency circuit, comprising the conductor 27, a capacitor C6, a conductor 28, a capacitor C7, the cathode-circuit 15, a capacitor C8, the grid-circuit G3, and a variometer L1, the other terminal of which is connected to the starting-point 27 of the tuned circuit.

The conductors 28 and G3 of this tuned circuit are respectively utilized to apply radioor carrier-frequency control-voltages, through blocking-capacitors BC2 and BC3 respectively, to the grids of two amplifier-tubes A1 and A2. The cathodes of the amplifiers A1 and A2 are connected to the cathode-circuit 15 of the oscillator OSC. The grids of the amplifier tubes A1 and A2 are connected, through grid-resistors GR1 and GR2, to the negative bus (—), so as to apply a negative bias equal to the drop across the cathode-circuit biasing-resistor R3. The two plates of the amplifiers A1 and A2 are connected to the primary-winding terminals of a radio-frequency output-transformer OT. This primary winding of said output-transformer OT has a midpoint-tap 30 which is connected to the negative supply-terminal (+) and also to the screen-grids of the two amplifiers A1 and A2.

The radio-frequency output-transformer OT has a secondary winding 31, having one of its terminals grounded, and having two taps 32 and 33. The output-transformer secondary-tap 32 is connected to phase-C of the line 1, through a variometer L2, a conductor 34, and a coupler-capacitor CC. The conductor 34 is also grounded through a grounding-coil GC. The other secondary tap 33 of the radio-frequency output-transformer OT is utilized to energize the primary winding of a receiver-coupling transformer RCT, through a tuning-capacitor T-C. The primary winding of the receiver-coupling transformer RCT is also preferably protected by a shunt-connected voltage-limiting gas-filled tube GT-2.

The receiver-coupling transformer RCT has a secondary winding 36 which is part of a tuned receiving-circuit, comprising said secondary winding 36, the grid-conductor G4 of a receiver-tube REC, a tuning-capacitor C9, the circuit or conductor 15, and thence back to the secondary winding 36.

The receiver-tube REC is a saturating-tube which carries a plate-cathode current which is of a substantially constant magnitude, whenever the tube is conducting at all, substantially regardless of the voltage applied to the grid-circuit G4, provided that this grid-voltage is high enough to cause plate-current to flow.

The receiver-tube REC has its cathode-circuit 37 energized from a tapped point of a potentiometer PO4 which is connected between the circuit 15 and the positive bus (+). The receiver-tube REC has a plate circuit P4, which is energized from the positive supply-terminal (+) through a radio-frequency choke-coil RFC-2. The receiver-tube REC also has a screen-grid circuit SG4 which is connected to the positive terminal (+).

The receiver-tube plate-circuit P4 is utilized to apply a restraining voltage to the grid-circuit G5 of a relay-tube RT, through a capacitor C-10, a conductor 40, a voltage-doubler which is generically indicated at 41, and a grid-circuit resistor R-10. The voltage-doubler, as explained in the Mehring et al. patent, consists of: an input-resistor R-11, which is connected between the conductor 40 and the cathode-circuit 22 of the second gas-tube V2; a capacitor C-11, which is connected between the circuit 40 and a circuit 42; a double-circuit rectifier-valve RV, and an output-resistor or loading-resistor R-12. The loading resistor R-12 is connected between the anode-circuit 43 of the lower rectifier of the rectifier-valve RV, and the cathode-circuit 22 of the second gas-tube V2. This anode-circuit 43 also constitutes the input-terminal of the grid-circuit resistor R-10 of the relay-tube RT. The cathode of the lower half of the double-rectifier valve RV is connected to the conductor 42, while the anode of the upper rectifier-circuit of the double valve RV is connected to this same conductor. The cathode of the upper rectifier of the double valve RV is connected to the cathode-circuit 22 of the second gas-tube V2. The output resistor R-12 of the voltage-doubler is bypassed by a ripple-smoothing radio-frequency bypass-capacitor BPC.

The relay-tube RT has its cathode-circuit 44 energized from a tapped point of a potentiometer PO5 which is connected between the conductor 15 and the positive supply-terminal (+). The plate-circuit P5 of the relay-tube RT is connected through the primary winding of a relay-operating transformer ROT, the conductor 8, the make-contact 9 of the high-set fault-detector FD2, and thence to the positive terminal (+). The screen-grid circuit SG5 of the relay-tube RT is also connected to the aforesaid conductor 8.

The relay output-transformer ROT has a secondary circuit 45 which is used to energize the operating coil R of the internal-fault-responsive pilot-channel relay R, which has a single make-contact 4, which is shown in the tripping-circuit as previously described.

The operation of the carrier-current equipment will be fairly evident from the foregoing description, which has pointed out the functional relationships of the various parts as they were named. When the transmission line 1 is operating normally, without any fault on it, the carrier-current transmitter, comprising the oscillator OSC and the two amplifiers A1 and A2, is in its normal inoperative condition.

When a fault of a predetermined severity occurs on the protected line-section 1, one or both of the two fault-detectors FD1 and FD2 will pick up. The low-set detector FD1 is the more sensitive of the two, and when it responds, it opens its back-contact 25, and thus removes a short-circuit from around the two gas-tubes V1 and V2. The grid-circuit settings of both of these gas-tubes V1 and V2 are more sensitive than the sensitive fault-detector FD1, so that said tubes are already in readiness to fire, in response to the alternating voltages which are applied to their respective grids G1 and G2, as soon as the sensitive fault-detector FD1 responds.

Whichever one of the two gas-tubes V1 and V2 has a positive grid voltage applied to it, at the moment of opening of the FD1 back-contact 25, will instantly begin firing, developing a certain positive voltage in its cathode-circuit 21 or 22, as the case may be, making said cathode-circuit positive with respect to the conductor 15. During the next half-cycle of the line-current, or output of the secondary winding 10 of the saturating transformer ST, a positive grid-voltage is applied to the other one of the two gas-tubes V1 and V2, causing this other tube to fire, putting out the first-firing gas-tube. The two gas-tubes V1 and V2 thus operate as sources of two different series of flat-topped voltage-waves of constant magnitude, one gas-tube being responsive to positive line-frequency half-cycles, while the other is responsive to negative line-frequency half-cycles.

Carrier-current is transmitter by the firing of the master-oscillator tube OSC during the flat-topped voltage-impulses which are supplied from the cathode-circuit 21 of the first gas-tube V1, thus transmitting a succession of bursts of carrier-current energy, which are applied to the line through the coupling capacitors CC, during line-current half-cycles of one polarity. The received carrier-current energy is applied, in a blocking fashion, to the grid-circuit G5 of the relay-tube RT, through the coupling capacitor C–10 and the voltage doubler 41, which operates to build up a negative voltage, in the loading resistor R–12, tending to make the grid of the relay-tube RT more negative, so that said relay-tube RT cannot become conducting while carrier is being received.

During the line-current half-cycles during which the second triggering tube V2 is firing, and during which the first triggering tube V1 is not firing, the cathode-circuit 22 of the second gas-tube V2 has a voltage which is positive with respect to the voltage of the circuit 15, thus impressing a positive or operating-voltage on the grid-circuit G5 of the relay-tube RT.

Conductive operation of the relay-tube RT is obtained during the line-frequency half-cycles when the second gas-tube V2 if firing, at the re-laying station, unless, at the same time, a suitable signal is received from the other terminal of the protected line-section.

If the fault is not within the limits of the protected line-section, the remote terminal will be transmitting the required carrier current during most or all of each of the half-cycles during which the operating-voltage is being applied to the relay-tube RT from the circuit 22 of the second gas-tube V2 at the illustrated relaying-station, and hence the relay-tube will not carry sufficient plate-current to energize the relay R.

If the fault is within the confines of the protected line-section, the equipment at the remote terminal of the section will not be transmitting the required carrier signal during the line-current half-cycles during which the operating voltage of the circuit 22 is being applied to the relay-tube RT, and hence this tube will conduct plate-circuit impulses, during alternate line-frequency half-cycles, thus energizing the relay-operating transformer ROT and the relay R.

It will be noted that the carrier-current equipment acts as a pilot-channel connecting the two ends of the protected line-section for the purpose of effecting a determination or comparison of the phase-angle between the two terminal line-currents of the protected line-section.

In order to insure the proper operation of the relay R, in view of its dependence upon fault-responsive relay-operations at two widely-separated points, namely at the two opposite ends of the protected line-section, it is necessary to make sure that the restraining impulses which are applied to the relay-tube RT are applied at least as soon as, and usually a trifle ahead of, the effective application of the operating-impulses to the grid-circuit G5 of this relay tube RT. In the illustrated system, this is done by utilizing a second mechanical fault-detector relay FD2, which responds to the same derived fault-current which is utilized to energize the first fault-detector relay FD1, but which has a slightly higher setting, such as responding to a current-value of approximately 125% of the pick-up of the first fault-detector FD1.

In the illustrated carrier-current system, I also make use of a back-contact 25, (rather than a make-contact,) on the first fault-detector FD1, because a back-contact will not bounce, in response to a fault, thus avoiding the possibility of a momentary interruption of the transmission of a blocking or restraining signal at the beginning of a fault, thus resulting in false tripping at the opposite terminal. I also use a make-contact 9, on the second fault-detector FD2, so that, even though both of the fault-detectors should pick up simultaneously, the detector having the back-contact will get that contact open before the other detector has moved far enough to close a normally open make-contact, thus insuring that a restraining-voltage is available, on the relay-tube RT, a trifle ahead of the effective application of an operating-voltage to the grid-circuit G5 of said relay tube RT.

In accordance with my present invention, the high-set fault-detector FD2, is used to control the slow-to-operate relay X2, so as to energize this relay whenever said high-set fault-detector FD2 responds. This fault-detector responds whether the fault is internal or external.

If it is an internal fault, the pilot-channel relay R will close its contact 4 within 3 line-frequency cycles after the beginning of the fault, thus energizing the trip-circuit before the slow-to-operate relay X2 can pick up its back-contact 5 in the tripping circuit.

In the event of an external fault, however, the pilot-channel relay R will not respond, and the high-set fault-detector FD2 will cause the slow-to-operate relay X2 to open its back-contact 5 in the tripping-circuit, after a delay of about 5 cycles. This interposes a break in the tripping circuit, which prevents a tripout of the protected line-section until some 6 to 8 cycles after the external fault has been cleared by the corresponding relaying apparatus in the line-section in which said external fault occurred. Thus, when the external fault is cleared, the fault-detector FD2 drops out and deenergizes the slow-to-operate relay X2, which has a dropout-time of some 6 to 8 cycles thereafter. In this way, I avoid any possibility of the occurrence of an erroneous tripout of the protected line-section 1 as a result of any short-duration disturbance or interruption of carrier which may be caused during, or immediately after, the clearing of the external fault.

An important feature of my invention is to provide means for quickly setting or deenergizing the slow-to-operate relay X2, in the event that an internal fault should develop within a few cycles after the occurrence of an external fault, and while the external fault is still being cleared. In such an event, the high-set fault-detector FD2 will not drop out until both faults have been cleared, but the internal-fault-responsive pilot-channel relay R will instantaneously or quickly respond, closing its contact 4 and thus energizing the auxiliary relay CSA, which instantly opens its back-contact 7 in the circuit of the slow-to-operate relay X2, so that the clearing of the internal fault is delayed only during the 6 or 8 cycles which are required for this slow-to-operate relay X2 to drop out and reclose its back-contact 5 in the tripping circuit for the protected line-section.

In this operation, the auxiliary relay CSA acts as a convenient means for providing an extra back-contact 7, which operates functionally the same as if it were secured to the pilot-channel relay R, while at the same time avoiding the imposition of the additional mechanical burden of an extra back-contact 7 on the sensitive, quick acting, light-weight pilot-channel relay R.

While I have illustrated and described my invention in but a single illustrative form of embodiment, I wish it to be understood that I am not limited to this particular form of embodiment, as many changes may be made, in the way of the substitution of equivalents, or the omission or addition of various features, without departing from the essential spirit of the invention, in its broadest aspects. I desire, therefore, that the appended claims shall be accorded the broadest construction consistent with their language.

I claim as my invention:

1. Fault-responsive protective relaying-means for one terminal of a protected section of an alternating-current transmission-line, comprising: a fault-detector which is responsive to transmission-line faults including faults outside of the protected line-section, a pilot-channel relaying-means for obtaining a selective instantaneous internal-fault indication in response to a comparison of line-conditions at the terminals of the protected line-section, a short-period time-delay means associated with said fault-detector, and means for obtaining a protective-relaying action in response to a response of said pilot-channel relaying means and a non-response of said time-delayed fault-detector.

2. The invention as defined in claim 1, characterized by the previously mentioned transmission-line being an alternating-current line; and the previously mentioned pilot-channel relaying-means being responsive to a comparison of the relative phase-angles of the line-currents at the opposite ends of the protected line-section.

3. The invention as defined in claim 1, characterized by the previously mentioned transmission-line being an alternating-current line; the previously mentioned fault-detector being the high-set fault-detector of two fault-detectors of differing sensitivities; and the previously mentioned pilot-channel relaying-means comprising: a pilot-channel communication-means for communicating with another terminal of the protected line-section; means for deriving a single-phase line-current-responsive relaying-quantity which is responsive to a plurality of different line-fault conditions; said fault-detectors being responsive to said relaying-quantity; line-current-responsive impulse-producing means, operating under the supervision of the low-set fault-detector, for applying a succession of operating-impulses, effective on said pilot-channel relaying-means, in response to derived line-current half-cycles of one polarity, and for delivering a succession of pilot-channel-controlling impulses to said pilot-channel communication-means in response to derived line-current impulses of the opposite polarity; receiving-means for applying restraining-impulses, effective on said pilot-channel relaying-means, in response to pilot-channel impulses received from another terminal of the protected line-section; and means for supervising said pilot-channel relaying-means in response to the high-set fault-detector.

4. Fault-responsive protective relaying-means for one terminal of a protected section of an alternating-current transmission-line, comprising: a fault-detector which is responsive to transmission-line faults including faults outside of the protected line-section, a pilot-channel relaying-means for obtaining a selective instantaneous internal-fault indication in response to a comparison of line-conditions at the terminals of the protected line-section, a short-period time-delay relay-means, means for causing said time-delay relay-means to be responsive to a response of said fault-detector and a non-response of said pilot-channel relaying-means, and means for obtaining a protective-relaying action in response to a response of said pilot-channel relaying-means and a non-response of said time-delayed relay.

5. The invention as defined in claim 4, characterized by the previously mentioned transmission-line being an alternating-current line; and the previously mentioned pilot-channel relaying-means being responsive to a comparison of the relative phase-angles of the line-currents at the opposite ends of the protected line-section.

6. The invention as defined in claim 4, characterized by the previously mentioned transmission-line being an alternating-current line; the previously mentioned fault-detector being the high-set fault-detector of two fault-detectors of differing sensitivities; and the previously mentioned pilot-channel relaying-means comprising: a pilot-channel communication-means for communicating with another terminal of the protected line-section; means for deriving a single-phase line-current-responsive relaying-quantity which is responsive to a plurality of different line-fault conditions; said fault-detectors being responsive to said relaying-quantity; line-current-responsive impulse-producing means, operating under the supervision of the low-set fault-detector, for applying a succession of operating-impulses, effective on said pilot-channel relaying-means, in response to derived line-current half-cycles of one polarity, and for delivering a succession of pilot-channel-controlling impulses to said pilot-channel communication-means in response to derived line-current impulses of the opposite polarity; receiving-means for applying restraining-impulses, effective on said pilot-channel relaying-means, in response to pilot-channel impulses received from another terminal of the protected line-section; and means for supervising said pilot-channel relaying-means in response to the high-set fault-detector.

HERBERT W. LENSNER.

REFERENCES CITED

The following references are of record in the file of this patent:

UNITED STATES PATENTS

| Number | Name | Date |
|---|---|---|
| 2,406,617 | Lensner | Aug. 27, 1946 |
| 2,408,868 | Mehring et al. | Oct. 8, 1946 |